(12) United States Patent
Rajagopalan et al.

(10) Patent No.: US 8,096,898 B2
(45) Date of Patent: *Jan. 17, 2012

(54) GOLF BALLS INCORPORATING RIGID, ROSIN-MODIFIED POLYMERS

(75) Inventors: Murali Rajagopalan, South Dartmouth, MA (US); Kevin M. Harris, New Bedford, MA (US); Pamela V. Arnold, Fairhaven, MA (US); Michael D. Jordan, East Greenwich, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,416

(22) Filed: Jan. 27, 2010

(65) Prior Publication Data

US 2010/0130308 A1 May 27, 2010

Related U.S. Application Data

(63) Continuation of application No. 12/010,044, filed on Jan. 18, 2008, now Pat. No. 7,654,915, which is a continuation of application No. 11/130,243, filed on May 17, 2005, now Pat. No. 7,320,649.

(51) Int. Cl.
*A63B 37/06* (2006.01)
(52) U.S. Cl. ...................................... 473/374
(58) Field of Classification Search .......... 473/373, 473/374
See application file for complete search history.

(56) References Cited

U.S. PATENT DOCUMENTS

| | | | |
|---|---|---|---|
| 3,078,254 A | 2/1963 | Zelinski et al. | 260/45.5 |
| 3,149,182 A | 9/1964 | Porter | 260/879 |
| 3,231,635 A | 1/1966 | Holden et al. | 260/880 |
| 3,262,272 A | 7/1966 | Barakauskas et al. | 60/39.05 |
| 3,265,765 A | 8/1966 | Holden et al. | 260/876 |
| 3,287,333 A | 11/1966 | Zelinski | 260/83.7 |
| 3,297,793 A | 1/1967 | Dollinger | 260/879 |
| 3,402,159 A | 9/1968 | Hsieh | 260/85.1 |
| 3,462,162 A | 8/1969 | Stoeffler et al. | 279/2 |
| 3,594,452 A | 7/1971 | De La Mare et al. | 260/880 |
| 3,595,942 A | 7/1971 | Wald et al. | 260/880 |
| 3,694,523 A | 9/1972 | Rollmann et al. | 260/880 |
| 3,808,180 A | 4/1974 | Owens | 260/885 |
| 3,842,029 A | 10/1974 | Saito et al. | 260/37 |
| 4,034,013 A | 7/1977 | Lane | 260/835 |
| 4,096,202 A | 6/1978 | Farnham et al. | 260/873 |
| 4,180,494 A | 12/1979 | Fromuth et al. | 260/40 |
| 4,292,233 A | 9/1981 | Binsack et al. | 260/40 |
| 4,431,193 A | 2/1984 | Nesbitt | 273/235 |

(Continued)

FOREIGN PATENT DOCUMENTS

WO WO2004/108817 12/2004

OTHER PUBLICATIONS

Non-Final Office Action dated Jan. 22, 2009 of corresponding U.S. Appl. No. 12/010,044.

*Primary Examiner* — Raeann Gorden
(74) *Attorney, Agent, or Firm* — Murphy & King, P.C.

(57) ABSTRACT

Golf ball compositions including a rosin-modified polymeric composition including a conventional ionomer, acid copolymer, highly neutralized polymer, or other suitable polymer that has been modified with a rosin material to impart stiffness through increasing the flexural modulus of the material.

18 Claims, 2 Drawing Sheets

U.S. PATENT DOCUMENTS

| | | | |
|---|---|---|---|
| 4,560,168 A | 12/1985 | Aoyama | 273/232 |
| 4,960,281 A | 10/1990 | Aoyama | 273/232 |
| 5,334,673 A | 8/1994 | Wu | 273/235 |
| 5,484,870 A | 1/1996 | Wu | 528/28 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,803,831 A | 9/1998 | Sullivan et al. | 473/374 |
| 5,849,168 A | 12/1998 | Lutz | 264/755 |
| 5,885,172 A | 3/1999 | Hebert et al. | 473/354 |
| 5,908,358 A | 6/1999 | Wu | 473/378 |
| 5,919,100 A | 7/1999 | Boehm et al. | 473/354 |
| 5,965,669 A | 10/1999 | Cavallaro et al. | 525/221 |
| 5,981,658 A | 11/1999 | Rajagopalan et al. | 525/66 |
| 6,056,843 A | 5/2000 | Dalton et al. | 156/243 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,371,869 B1 | 4/2002 | Kato et al. | 473/365 |
| 6,386,992 B1 | 5/2002 | Harris et al. | 473/371 |
| 6,488,597 B2 | 12/2002 | Iwami et al. | 473/378 |
| 6,503,156 B1 | 1/2003 | Sullivan | 473/374 |
| 6,506,130 B2 | 1/2003 | Sullivan | 473/374 |
| 6,524,200 B2 | 2/2003 | Kato et al. | 473/365 |
| 6,575,850 B1 | 6/2003 | Iwami et al. | 473/378 |
| 6,608,127 B1 | 8/2003 | Kato et al. | 473/365 |
| 6,632,147 B2 | 10/2003 | Cavallaro et al. | 473/374 |
| 6,663,510 B1 | 12/2003 | Iwami et al. | 473/378 |
| 6,664,334 B2 | 12/2003 | Iwami et al. | 525/93 |
| 6,908,402 B2 | 6/2005 | Sullivan et al. | 473/376 |
| 7,320,649 B2 * | 1/2008 | Rajagopalan et al. | 473/374 |
| 7,654,915 B2 * | 2/2010 | Rajagopalan et al. | 473/373 |
| 2001/0009310 A1 | 7/2001 | Hebert et al. | |
| 2001/0014632 A1 | 8/2001 | Iwami et al. | |
| 2001/0018375 A1 | 8/2001 | Hayashi et al. | |
| 2001/0019971 A1 | 9/2001 | Hayashi et al. | |
| 2001/0031670 A1 | 10/2001 | Iwami et al. | |
| 2002/0025862 A1 | 2/2002 | Sullivan et al. | |
| 2002/0028885 A1 | 3/2002 | Sullivan et al. | |
| 2003/0096936 A1 * | 5/2003 | Wu et al. | 528/76 |
| 2003/0225197 A1 | 12/2003 | Rajagopalan et al. | |
| 2004/0162399 A1 | 8/2004 | Reddy et al. | |
| 2005/0020741 A1 * | 1/2005 | Chen | 524/270 |

* cited by examiner

ND CROSS-REFERENCE TO RELATED APPLICATIONS

GOLF BALLS INCORPORATING RIGID, ROSIN-MODIFIED POLYMERS

CROSS-REFERENCE TO RELATED APPLICATIONS

This application is a continuation of U.S. patent application Ser. No. 12/010,044, filed Jan. 18, 2008, now U.S. Pat. No. 7,654,915, which is a continuation of U.S. patent application Ser. No. 11/130,243, filed May 17, 2005, now U.S. Pat. No. 7,320,649, the entire disclosures of which are incorporated by reference herein.

FIELD OF THE INVENTION

The present invention relates to golf balls having at least one layer formed from compositions including rosin-modified polymer. In particular, the compositions of the invention can include a conventional ionomer, acid copolymer, or other suitable polymer that has been modified with a rosin material to impart stiffness through increasing the flexural modulus of the material.

BACKGROUND OF THE INVENTION

Ionomer resin materials are generally used for their durability in golf ball inner cover and outer cover layers. For example, when golf balls include an outer cover layer formed from an ionomeric material, the golf ball provides a good combination of distance and durability. In fact, U.S. Pat. No. 4,431,193 relates to a golf ball having a multilayer cover wherein the inner layer is a hard, high flexural modulus ionomer resin and the outer layer is a soft, low flexural modulus ionomer resin, and wherein either (or both) layer may include a foamed ionomer resin.

But, because ionomer-covered golf balls have a hard "feel" and lower spin rate when struck with a club, golf ball manufacturers typically replace the ionomer cover with a softer cover formed from polyurethane or polyurea. The softness of the polyurethane and polyurea materials can be balanced with a harder inner cover or intermediate layer.

Since the inner cover layer or intermediate layer is intended to provide a degree of stiffness to a soft cover ball, the materials selected must have suitable flexural modulus values. As such, ionomer resins are generally used to form at least a part of the inner cover layer or intermediate layer in a soft cover golf ball. To date, however, commercially available ionomer resins do not have a flexural modulus greater than 70,000 psi measured after 2 weeks with 4-point blending. For example, SURLYN® 8940, 9650, and 9910 have flexural modulus values of 51,000 psi, 32,000 psi, and 48,000 psi, respectively.

Thus, it would be advantageous to produce a composition that provides improved stiffness to an inner cover layer or intermediate layer for use with a soft cover golf ball to provide reduced spin rate off the driver to increase distance. In particular, there exists a need for golf ball layer compositions that have hard, high flexural modulus values, i.e., values greater than that which is commercially available. The present invention provides a composition with higher flexural modulus values to provide a greater degree of stiffness to the golf ball.

SUMMARY OF THE INVENTION

The present invention is directed to a golf ball including a core, an intermediate layer, and a cover, wherein the intermediate layer is formed from a composition including an ionomer resin and a rosin material having a softening point of at least about 50° C. In one embodiment, the rosin material is selected from the group consisting of rosins from wood oil, rosins from tall oil, dimerized rosins, hydrogenated rosin derivatives, modified rosins, ester rosins, esters of dimerized rosins, esters of hydrogenated rosins, esters of modified rosins, rosin amines, rosin ethoxylated derivatives, polyterpene rosins, maleic anhydride modified esters of tall oil rosins, fumaric anhydride modified esters of tall oil rosins, hydrogenated abietic acid, and salts (if applicable) and mixtures thereof. In another embodiment, the rosin material is present in an amount of about 5 percent to about 50 percent by weight of the composition.

The composition may have a flexural modulus of about 70,000 psi to about 120,000 psi at 40 hours. And, in one embodiment, the flexural modulus is greater than about 80,000 psi after 2 weeks. In addition, the rosin may have an acid number of about 1 to about 30, an iodine number from about 10 to about 200, and a density of about 5 lbs/gal to about 20 lbs/gal.

The present invention is also directed to a golf ball including a core and a cover, wherein the cover includes an inner cover layer and an outer cover layer, and wherein the inner cover layer is formed from a composition including a base thermoplastic material and a rosin material, wherein the composition has a flexural modulus of about 60,000 psi to about 120,000 psi after 40 hours and a hardness of about 60 Shore D to about 75 Shore D.

The base thermoplastic material can be selected from the group consisting of ionomer resins, acid copolymers, highly neutralized polymers, and mixtures thereof. In one embodiment, the thermoplastic material is a highly neutralized polymer having about 90 percent or more of the acid groups neutralized.

In another embodiment, the composition has a flexural modulus is about 70,000 psi to about 120,000 psi after 40 hours. In yet another embodiment, the flexural modulus increases by about 15 percent or more after 2 weeks.

The composition can further include an impact modifier. In one embodiment, the impact modifier is selected from the group consisting of alkyl acrylate-based block copolymers or hydrogenated derivatives thereof, vinyl aromatic monomers, or mixtures thereof.

The present invention is also directed to a golf ball including a core, a cover having a hardness of about 30 Shore D to about 60 Shore D, and an intermediate layer having a hardness of about 60 Shore D to about 75 Shore D, wherein the intermediate layer is formed from a composition including a rosin-modified polymer having a flexural modulus of about 60,000 psi to about 120,000 psi after 40 hours, and wherein the flexural modulus increases by about 15 percent or more after 2 weeks. In one embodiment, the rosin-modified polymer includes a thermoplastic polymer and a rosin material. In another embodiment, the thermoplastic polymer is a highly neutralized polymer having about 90 percent or more of the acid groups neutralized.

In addition, the rosin material can be selected from the group consisting of rosins from wood oil, rosins from tall oil, dimerized rosins, hydrogenated rosin derivatives, modified rosins, ester rosins, esters of dimerized rosins, esters of hydrogenated rosins, esters of modified rosins, rosin amines, rosin ethoxylated derivatives, polyterpene rosins, maleic anhydride modified esters of tall oil rosins, fumaric anhydride modified esters of tall oil rosins, hydrogenated abietic acid, and salts (if applicable) and mixtures thereof. In one embodiment, the rosin material has at least one of an acid number of about 1 to about 30, an iodine number from about 10 to about 200, a density of about 5 lbs/gal to about 20 lbs/gal, or a softening point of at least about 50° C.

Furthermore, the cover of the golf ball of the invention may be formed from a castable thermoplastic polyurethane or polyurea material or, in the alternative a castable reactive liquid material including thermoset polyurethane or polyurea.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
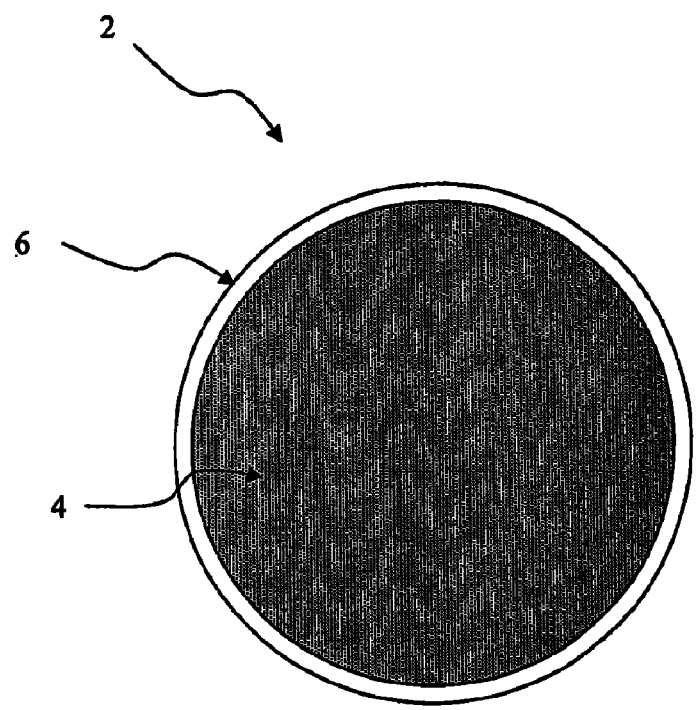
FIG. 1 is a cross-sectional view of a two-piece golf ball, wherein the cover is formed from a composition of the invention.

The present invention relates to compositions having increased stiffness for use in inner cover and intermediate layers of golf balls. In particular, the compositions of the invention include rosin-modified polymers having improved flexural modulus values for use in golf ball layers.

The compositions of the invention, can be used with a variety of golf ball constructions. For example, the compositions of the invention may be used as an intermediate layer in a three-piece ball, an inner cover layer in a golf ball having dual cover layers, or as a casing layer in a golf ball having a large core and a relatively thin outer cover layer. The composition components, golf ball constructions, and layer and ball properties are discussed in greater detail below.

The Compositions of the Invention

The compositions of the invention include a rosin-modified polymer for increased stiffness. A variety of polymers may be modified with rosins according to the present invention. These polymers, which are discussed in more detail below, include, but are not limited to, conventional ionomers including low and high acid ionomers, acid copolymers, and highly or fully neutralized polymers. These polymers are discussed in greater detail below.

Rosins

Rosins are, by definition, a yellowish to amber translucent, hard, brittle, fragmented resin left after distilling the oil of turpentine from the crude oleoresin of the pine and are generally used in making varnishes, varnish and paint driers, printing inks, and for rubbing on the bows of string instruments, such as violins. Without being bound to any particular theory, it has now been discovered that the addition of rosins to conventional golf ball compositions, such as thermoplastic materials used for intermediate and inner cover layers, improves the stiffness, as measured by the flexural modulus, of the golf ball layer. The softening point (or melting point) of the rosin is preferably about 20° C. to about 150° C. In one embodiment, the rosin has a softening point of about 30° C. to about 140° C. In yet another embodiment, the softening point of the rosin is at least about 50° C. For example, the rosin softening point can range from about 50° C. to about 150° C., from about 70° C. to about 150° C., from about 90° C. to about 150° C., and points therebetween.

Examples of suitable rosins include, but are not limited to, rosins from wood and tall oil, such as Palmite® 79, Palmite® 90, Pexite® FF, and Pexite® WG (commercially available from Hercules and Eastman, respectively); modified rosins, such as Belro®, Pexalyn® 100, Vinsol®, and Melhi® (commercially available from Hercules); ester rosins, such as Foralyn® (commercially available from Eastman), Ester Gum 8BG and Ester Gum 8D-SP (a glycerol ester of wood rosin and tall oil rosin, respectively, both commercially available from Hercules); methyl esters of rosins, such as Abalyn® (commercially available from Eastman); rosin amines; polyterpene rosins; maleic and fumaric anhydride modified esters of tall oil rosins, such as Sylvaprint® 4253 and Sylvaprint® 8200 (commercially available from Arizona Chemical) and Lewisol 28-M (a glycero-ester of rosin modified with maleic anhydride commercially available from Eastman); hydrogenated abietic acid; and mixtures thereof. Those of ordinary skill in the art will appreciate that salts of the various rosins are also suitable for use with the present invention.

In addition, U.S. Patent Publication Nos. 2001/0014632 and 2001/0031670, the disclosures of which are incorporated by reference herein, discusses other suitable rosins and tackifiers that may be used in the present invention. For example, coumarone-indene based resin, phenol-formaldehyde based resin, alkyl phenol based resin, petroleum based resin, xylene-formaldehyde based resin, oligomer of polybutene, liquid rubber, e.g., liquid polyisoprene, and mixtures thereof can be used. Commercially available petroleum based resins include hydrogenated terpene resin Clearon P105 from Yasuhara Chemical Co., Ltd., Arkon P90 and Ester Gum H from Arakawa Chemical Industries Ltd., and Petroresin #80 and Hilets G100X from Mitsui Petrochemical Industries Ltd. In one embodiment, the rosin is terpene resin, rosin ester based resin, or a combination thereof.

Furthermore, rosin derivatives are suitable for use with the present invention. Those of ordinary skill in the art are aware of suitable methods for forming rosin derivatives. For example, rosin derivatives may be formed by hydrogenating, dimerizing, or esterificating the rosin contained in tall oil or raw pine. Rosin derivatives include Nikanol A70 from Mitsubishi Gas Chemical Co., Inc., Lignol R70 from Libnite, and rosin ester resin from Arakawa Chemical Industries Ltd.; rosin ethoxylated derivatives; dimerized rosins, such as Poly-Pale® and Dymerex® (commercially available from Eastman); esters of dimerized rosins, such as Permalyn® 505, Permalyn® 2085, Permalyn® 3100, Pentalyn® A (commercially available from Eastman), and Ester Gum 10D (a glycerol ester of partially dimerized rosin commercially available from Hercules); esters of hydrogenated rosins, such as Pentalyn® C and Pentalyn® K (commercially available from Eastman); esters of modified rosins, such as Foral® 85, Staybelite®, and Pentalyn® G and Pentalyn® X (commercially available from Eastman); and hydrogenated rosin derivatives, such as Staybelite® and Foral® AX (both commercially available from Eastman) and Hercolyn® D (a hydrogenated methyl ester of wood rosin commercially available from Hercules), are suitable for use with the present invention.

The acid number of the rosin for use with the present invention is preferably from about 0.1 to about 250. For example, the acid number can be less than about 1. In one embodiment, the acid number of the rosin ranges from about 0.1 to about 160. In still another embodiment, the acid number of the rosin is from about 0.1 to about 100, preferably from about 0.1 to about 30, preferably from about 1 to about 30. In yet another embodiment, the acid number ranges from about 12 to about 40, preferably about 16 to about 25. Further still, the acid number can range from about 0.1 to about 4.

In addition, the iodine number of the rosin can range from about 10 to about 200, preferably about 15 to about 150. In one embodiment, the iodine number is about 130 to about 160. In another embodiment, the iodine number is about 120 to about 135. In yet another embodiment, the iodine number ranges from about 15 to about 45.

Finally, the density of the rosin preferably ranges from about 5 lbs/gal to about 20 lbs/gal. In one embodiment, the rosin density is about 5 lbs/gal to about 15 lbs/gal. In another embodiment, the density of the rosin is about 5 to about 10 lbs/gal.

Ionomer Resins

As used herein, the term "ionomer" is intended to encompass those polymers which include acidic groups, such as carboxylate or sulfonate, the acidic groups being at least partially neutralized with a conjugate base. In addition, an "ionomer" may include those polymers which include basic groups, such as primary, secondary, and tertiary nitrogen, the basic groups being at least partially quaternized with an acid, organic alkyl halide, or organic aryl halide.

Those of ordinary skill in the art are aware of the methods to make ionomer resins for use with the present invention. In particular, U.S. Pat. No. 3,262,272, which is incorporated in its entirety by reference herein, outlines a general method to obtain ionomer resins. For example, copolymerization of an acidic monomer, such as acrylic or methacrylic acid, with at least one other comonomer, such as an olefin, styrene or vinyl acetate, followed by at least partial neutralization produces an ionomer suitable for use with the present invention. Alternatively, acidic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization. Negatively charged acidic groups, such as carboxylate or sulfonate, may be neutralized with a cation, such as a metal ion. Positively charged basic groups, such as quaternary nitrogen, may be neutralized with an anion, such as a halide, an organic acid, or an organic halide.

Examples of suitable ionomer resins and blends thereof are also disclosed in U.S. Pat. No. 5,885,172, which is incorporated in its entirety by reference herein. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The ionomer also may include so-called "low acid" and "high acid" ionomers. In general, ionic copolymers including up to about 16 percent acid are considered "low acid" ionomers, while those including greater than about 16 percent acid are considered "high acid" ionomers by the present inventors. A high acid ionomer may be a copolymer of an olefin, e.g., ethylene, and at least 16 weight percent of an $\alpha,\beta$-ethylenically unsaturated carboxylic acid, e.g., acrylic or methacrylic acid, wherein about 10 percent to about 100 percent of the carboxylic acid groups are neutralized with a metal ion, e.g., zinc, sodium, magnesium or lithium. Preferably, the high acid ionomer is a copolymer of ethylene and about 17 weight percent to about 20 weight percent methacrylic acid wherein about 35 percent to about 100 percent of the carboxylic acid groups are neutralized by sodium.

Ionomer resins are commercially available from DuPont under the tradename SURLYN® and from Exxon under the tradename Iotek®. Low acid ionomer resins include, but are not limited to SURLYN® 8940 (Na), SURLYN® 9650 (Zn), and SURLYN® 9910 (Zn). More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN® 8140 (Na) and SURLYN® 8546 (Li) which have an methacrylic acid content of about 19 percent.

Other suitable ionomers for use in the blends of the present invention include polyolefins, polyesters, poly(trimethylene terephthalate), polystyrenes, SBS, SEBS, and polyurethanes, in the form of homopolymers, copolymers, or block copolymer ionomers.

Acid Copolymers

The compositions of the invention can be based on an acid copolymers. For example, acid-containing olefin copolymers can be modified with any of the rosins discussed above. Suitable acid-containing olefin copolymers include, but are not limited to, acid-containing ethylene copolymers, acid-containing propylene copolymers, acid-containing butylene copolymers, and the like.

Non-limiting examples of acid-containing ethylene copolymers ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate.

Highly or Fully Neutralized Polymers

The compositions of the invention can also be based on highly neutralized polymers (HNP) or fully neutralized polymer (FNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. For example, HNPs produced from fatty acids may be used in the compositions of the present invention. Such HNPs are commercially available from DuPont under the trade name HPF.

The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can includes about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In one aspect of the invention the compositions of the invention are based on fully neutralized polymers. As used herein, a fully neutralized polymer or FNP has all of the acid groups (100 percent) neutralized.

Forming the Rosin-Modified Polymers

The rosin-modified polymers of the present invention may be formed in a variety of ways. For example, the polymers may be formed by in-situ polymerization of at least one acid copolymer and suitable rosin material, which is followed by reactive processing with a suitable cation to neutralize the acid groups from about 10 to 100 percent. Those of ordinary skill in the art understand that in-situ polymerization refers to forming a polymeric material in the presence of a previously formed polymeric material and that the reactive processing with the cation occurs in the same reactor. In addition, the reactive processing may further include an organic acid and/or an organic acid salt as discussed in more detail below.

Another suitable method of forming the rosin-modified polymers of the present invention includes mixing at least one acid copolymer (or components to form the acid copolymer) with a suitable rosin material in polymer mixing equipment, e.g., a single extruder or a twin-screw extruder. Once the rosin-modified polymer has been formed, a suitable neutralizing agent, e.g., a cation, is added. Similar to the method discussed above, an organic acid and/or an organic acid salt may also be incorporated at this time.

A third method of forming the rosin-modified polymers of the present invention includes mixing the rosin material and at least one acid copolymer that has been separately neutralized prior to mixing with a suitable neutralizing agent, e.g., a cation, by hand-mixing or passing through. In this method, the mixing may be performed with suitable polymer mixing equipment, such as a single or twin-screw extruder. The resultant rosin-modified polymer may be further neutralized using a neutralizing agent to achieve a higher degree of neutralization.

In addition, the rosin and the polymer may be solution blended. Regardless of the method, the rosin is preferably included in an amount of about 5 percent to about 50 percent by weight of the total mixture. In one embodiment, the rosin is included in an amount of about 8 percent to about 42 percent by weight of the total mixture. In another embodiment, the mixture includes about 10 percent to about 40 percent by weight of the mixture.

Additives

Because rosins are short chain polymers, the addition of impact modifiers can be used to increase the impact strength of the composition. Those of ordinary skill in the art will recognize, however, that the impact modifiers may include a functional group or need to modified to include such a functional group in order to be more compatible with the rosin and the polymer. One method of obtaining such a functional group is to graft the impact modifier.

Suitable impact modifiers include, but are not limited to, alkyl acrylate-based block copolymers, such as methyl-methacrylate-styrene-butadiene ("MMA-SBS"), or hydrogenated derivatives thereof, vinyl aromatic monomers, or mixtures thereof. These modifiers include both homopolymers and copolymers, including random, block, radial block, graft, core-shell copolymers, and mixtures thereof.

In one embodiment, the alkyl acrylate-based block copolymers include those homopolymers having the structure:

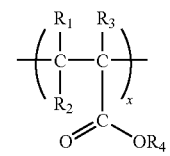

where x is a repeat unit from 100 to 100,000, $R_1$, $R_2$, and $R_3$ independently are H, aryl, or alkyl moieties (i.e., methyl, ethyl, propyl, butyl, pentyl, and hexyl) having the formula $C_nH_{2+1}$, where n is from 1 to 6, and $R_4$ is an alkyl moiety having the formula $C_nH_{2n+1}$; copolymers having the structure:

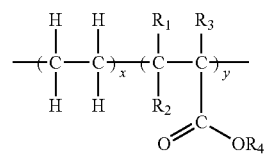

where x is from about 99 to about 1 weight percent, y is from about 1 to about 99 weight percent, $R_1$, $R_2$, and $R_3$ independently are H, aryl, or alkyl moieties (i.e., methyl, ethyl, propyl, butyl, pentyl, and hexyl) having the formula $C_nH_{2n+1}$, where n is from 1 to 6, and $R_4$ is an alkyl moiety having the formula $C_nH_{2n+1}$; and terpolymers having the structure:

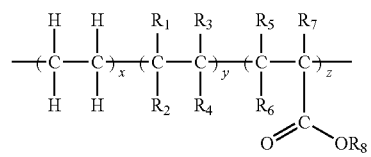

where x is from about 98 to about 1 weight percent, y is from about 1 to about 98 weight percent, z is from about 1 to about 10 weight percent, $R_1$, $R_2$, $R_3$, $R_4$, $R_5$, $R_6$, and $R_7$ independently are H, aryl, or alkyl moieties (i.e., methyl, ethyl, propyl, butyl, pentyl, and hexyl) having the formula $C_nH_{2n+1}$, where n is from 1 to 6, and $R_8$ is an alkyl moiety having the formula $C_nH_{2n+1}$.

Examples include, but are not limited to, poly(methyl acrylate); poly(methyl methacrylate); poly(ethyl acrylate); ethylene-methyl acrylate copolymer; and ethylene-ethyl acrylate copolymer. The impact modifying polymer may also be an acrylate-based block copolymer, which includes, but is not limited to, block methyl methacrylate, block methyl methacrylate-styrene-butylene, and block methyl methacrylate-styrene butadiene. Representative structures are below:

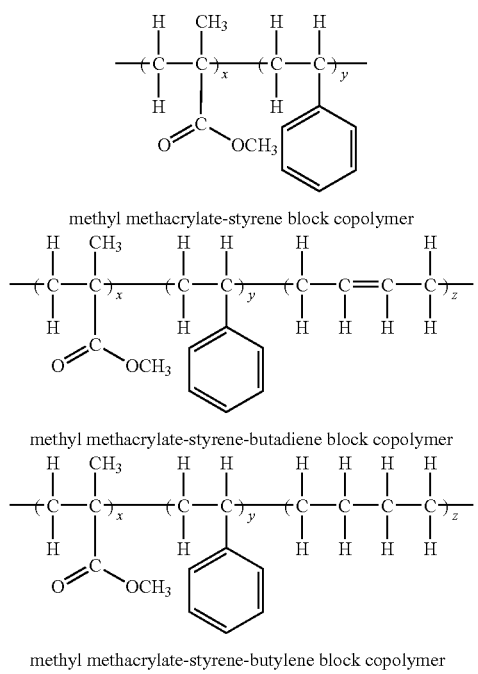

Suitable vinyl aromatic monomers include AB and ABA type block and radial copolymers and vinyl aromatic conjugated diene core-shell graft copolymers. For example, block copolymers comprising monoalkenyl arene blocks and conjugated diene blocks, e.g., butadiene and isoprene, or olefin blocks, e.g., ethylene-propylene and ethylene-butylene, are contemplated by the present invention. The conjugated diene blocks may be partially or completely hydrogenated so that the properties are similar to the olefin block copolymers.

U.S. Pat. Nos. 3,078,254, 3,402,159, 3,297,793, 3,265,765, and 3,594,452, the disclosures of which are incorporated in their entirety by reference herein, provide suitable AB type block copolymers for use as impact modifiers according to the present invention including polystyrene-polybutadiene (SBR), polystyrene-polyisoprene, and poly(α-methylstyrene)-polybutadiene. Suitable ABA triblock copolymers are disclosed in U.S. Pat. Nos. 3,149,182, 3,231,635, 3,462,162, 3,287,333, 3,595,942, 3,694,523, 3,694,523, and 3,842,029, which are incorporated herein in their entirety by reference.

Core-shell type graft copolymers suitable for use with the present invention have a predominantly conjugated diene rubbery core or a predominantly cross-linked acrylate rubbery core and one or more shells polymerized thereon and derived from monoalkenylarene and/or acrylic monomers alone or in combination with other vinyl monomers. Suitable core-shell type graft copolymers are commercially available from Rohm & Haas Company of Philadelphia, Pa. under the tradenames KM-611®, KM-653®, and KM-330®. U.S. Pat. Nos. 3,808,180, 4,034,013, 4,096,202, 4,180,494, and 4,292,233, the disclosures of which are incorporated in their entirety by reference herein, also discuss suitable core-shell type graft copolymers for use with the present invention.

In addition, silicone-acrylate impact modifiers are contemplated for use with the present invention. U.S. Patent Publication No. 2004/0162399 discusses suitable silicone-acrylate impact modifiers, the disclosure of which is entirely incorporated herein by reference. Other suitable impact modifiers include thiokol rubber, polysulfide rubber, polyurethane rubber, polyether rubber such as polypropylene oxide, epichlorohydrin rubber, ethylene-propylene rubber, thermoplastic polyester elastomers, thermoplastic ether-ester and ether-amide elastomers, and combinations thereof.

Preferably, the impact modifier has a glass transition temperature ($T_g$) that ranges from about $-100°$ C. to $0°$ C. In one embodiment, the impact modifier has a $T_g$ from about $-50°$ C. to about $-25°$ C. In another embodiment, the $T_g$ of the impact modifier is from about $-50°$ C. to $-30°$ C.

In addition, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about $250°$ F. to $400°$ F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Composition Blends

The rosin-modified polymers of the present invention may be present in a blend with other suitable materials. For example, the rosin-modified polymers may be blended with conventional ionomers, highly neutralized polymers, and other suitable thermoplastic materials.

The composition of the invention preferably includes about 1 percent to about 100 percent of the rosin-modified polymer of the invention. In one embodiment, the composition contains about 10 percent to about 90 percent of the rosin-modified polymer, preferably from about 10 percent to about 75 percent of the rosin-modified polymer, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

The compositions of the invention may also be in the form of a blend with at least one highly neutralized polymer or fully neutralized polymer. Suitable HNPs for inclusion in a blend include, but are not limited to, polymers containing $\alpha,\beta$-unsaturated carboxylic acid groups, or the salts thereof, that have been highly neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending). The acid moieties of the HNPs, typically ethylene-based ionomers, are neutralized greater than about 70 percent, more preferably greater than about 90 percent, and most preferably at least about 100 percent.

Composition Properties

As discussed briefly above, the rosin-modified polymeric compositions of the invention preferably have a flexural modulus greater than that of conventional ionomers. As known to those of ordinary skill in the art, depending on the material, the flexural modulus values differ if measured at different times. Thus, in one embodiment, the flexural modulus of the compositions of the invention is greater than about 50,000 psi at 40 hours. In another embodiment, the flexural modulus of the compositions of the invention is about 60,000 psi to about 120,000 psi at 40 hours, preferably about 70,000 psi to about 120,000 psi at 40 hours. For example, the compositions of the invention may have a flexural modulus of about 80,000 psi to about 110,000 psi after 40 hours. Flexural modulus is measured according to the ASTM D-790 and ASTM D6272-02 (50 percent relative humidity, 23° C.).

The flexural modulus of the compositions of the invention increases over time. For example, the flexural modulus of the compositions of the invention can increase by about 10 percent or more after 2 weeks. In one embodiment, the flexural modulus increases by about 15 percent or more after 2 weeks. In another embodiment, the compositions of the invention increase in stiffness, i.e., flexural modulus, by about 20 percent or more after 2 weeks. For example, the flexural modulus of the rosin-modified polymeric composition can increase by about 25 percent or more after 2 weeks.

As such, in one embodiment, the flexural modulus of the compositions of the invention is greater than about 60,000 psi at 2 weeks. In another embodiment, the flexural modulus of the compositions of the invention is greater than about 70,000 psi at 2 weeks, preferably greater than about 75,000 psi at 2 weeks. For example, the compositions of the invention may have a flexural modulus of greater than about 80,000 psi after 2 weeks. In still another embodiment, the flexural modulus of the compositions of the invention is about 85,000 psi to about 95,000 psi after 2 weeks. In yet another embodiment, the flexural modulus of the compositions of the invention is about 90,000 psi to about 115,000 psi after 2 weeks.

When the composition is a blend of the rosin-modified polymer and another polymer, the flexural modulus may be lower than a composition of the invention including only the rosin-modified polymer. For example, an 80/20 blend of a rosin-modified polymer and a highly neutralized polymer can produce flexural modulus values of about 45,000 or greater after 40 hours and about 50,000 psi to about 90,000 psi after 2 weeks. In one embodiment, an 80/20 blend of rosin-modified polymer and a highly neutralized polymer produces a composition having a flexural modulus of about 55,000 psi to about 70,000 psi after 2 weeks.

The hardness of a composition of the invention is preferably about 50 Shore D to about 80 Shore D. In one embodiment, the compositions of the invention have a Shore D hardness of about 60 Shore D to about 75 Shore D.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the compositions of the invention may be used in a core, an intermediate layer, and/or a cover of a golf ball, each of which may have a single layer or multiple layers.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multilayer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Figure 2:
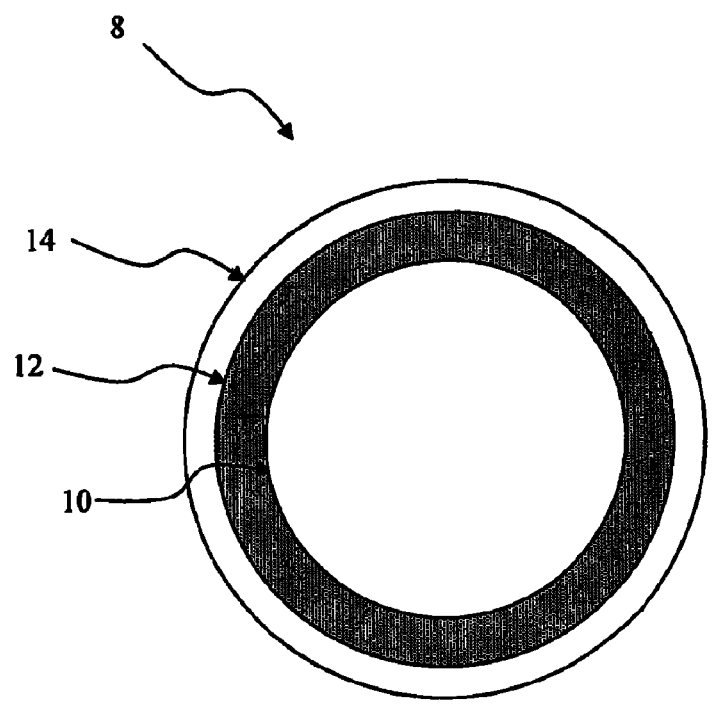
FIG. 2 is a cross-sectional view of a multi-component golf ball, wherein at least one layer is formed from a composition of the invention.
Figure 3:
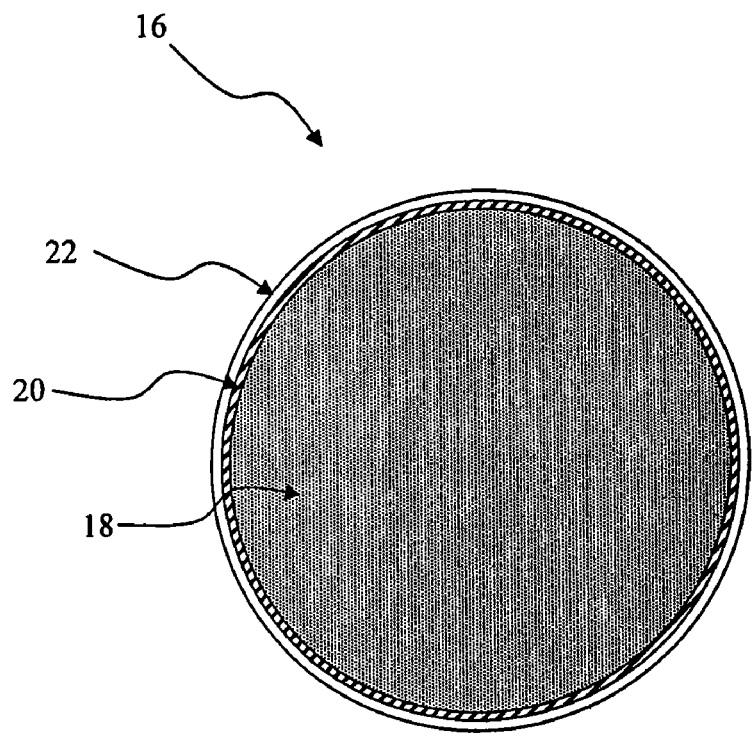
FIG. 3 is a cross-sectional view of a multi-component golf ball having a large core, wherein at least one layer is formed from a composition of the invention.

Referring to FIG. 1, a golf ball 2 of the present invention can include a center 4 and a cover 6 surrounding the center 4. Referring to FIG. 2, a golf ball 8 of the present invention can include a center 10, a cover 14, and at least one intermediate layer 12 disposed between the cover and the center. Each of the cover and center layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer.

Figure 4:
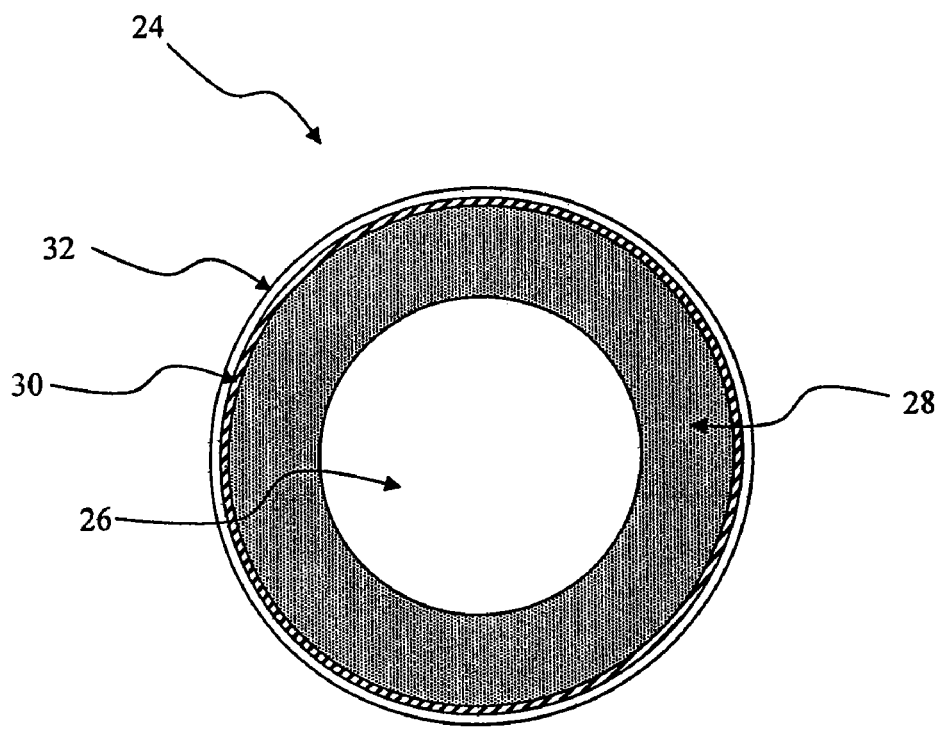
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the rosin-modified polymers of the invention may be incorporated into any component of a golf ball, including the core.

A free-radical source, often alternatively referred to as a free-radical initiator, may optionally be used in the core, or one or more layers of the golf balls according to the invention, particularly when a polymer component includes a thermoset material. The free radical source for is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from a rosin-modified polymer of the invention.

The intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In one embodiment, the intermediate layer may be a moisture barrier layer as disclosed in U.S. Pat. No. 6,632,147. Thus, a golf ball of the invention may include an intermediate layer that has a moisture vapor transmission rate lower than that of the cover and, additionally, a primary ingredient of the intermediate layer is made from a material including polybutadiene, natural rubber, butyl-based rubber, acrylics, transpolyisoprene, neoprene, chlorinated polyethylene, balata, multi-layer thermoplastic films, blends of ionomers, polyvinyl alcohol copolymer and polyamides, and dispersions of acid salts of polyetheramines. In another embodiment, golf balls of the invention include an intermediate layer or inner cover layer formed from the compositions of the invention and an additional moisture barrier layer.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly(propylene), polyethylene, polyamide, poly(oxymethylene), polyketone, poly(ethylene terephthalate), polyp-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a rosin-modified polymer of the invention.

When the rosin-modified polymers of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like. When the intermediate layer is formed from the rosin-modified polymeric compositions of the invention, for example, the components are first mixed with polymer mixing equipment, such as a single or twin-screw extruder, and then injection molded onto an inner ball.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. The resultant golf balls prepared according to the invention typically will have dimple coverage greater than about 60 percent, preferably greater than about 65 percent, and more preferably greater than about 70 percent.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used. Preferably, the overall diameter of the core and all intermediate layers is about 80 percent to about 98 percent of the overall diameter of the finished ball. The core may have a diameter ranging from about 0.5 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches. In one embodiment, the core diameter is about 1.59 inches or greater. In another embodiment, the diameter of the core is about 1.64 inches or less. When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.5 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In another embodiment, the intermediate layer thickness is about 0.05 inches or less, more preferably about 0.01 inches to about 0.045 inches.

Hardness

The golf ball layers containing the compositions of the invention preferably have a have a material hardness greater than about 50 Shore D. It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range.

In one embodiment, the material hardness of composition of the invention is about 55 Shore D to about 80 Shore D. In another embodiment, the composition has a material hardness of about 60 Shore D to about 75 Shore D.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to about 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Alternatively, the maximum COR of the ball is one that does not cause the golf ball to exceed initial velocity requirements established by regulating entities such as the USPGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

Spin Rate

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball of the invention hit with a golf club driver under the same test conditions is between about 1200 rpm to about 4000 rpm. In a preferred embodiment, the spin rate of a golf ball hit with a golf club driver is between about 2000 rpm to about 3500 rpm, more preferably between about 2500 and 3100 rpm.

For an 8-iron ball spin test, a spin rate of a golf ball struck by a standard 8-iron club was obtained by using test conditions for a Titleist Pro V1 golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of a golf ball with an average, cleanly struck 8-iron shot is between 5500 rpm and 10,000 rpm. In preferred embodiment, the spin rate of a golf ball of the invention with an average, cleanly struck 8-iron shot under the same test conditions is between 6000 rpm and 8500 rpm, more preferably between about 6500 rpm and 7500 rpm.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 g/(m2×day) or less, such as about 0.45 to about 0.95 g/(m2×day), about 0.01 to about 0.9 g/(m2×day) or less, at 38° C. and 90 percent relative humidity.

EXAMPLES

The following examples are only representative of the methods and materials for use in golf ball compositions and golf balls of this invention, and are not to be construed as limiting the scope of the invention in any way.

Example 1

Rosin-Modified Inner Cover Layers

Two rosin-modified compositions and one non-modified composition (control) were tested for material performance, as well as for performance as part of a finished ball. In particular, Formulation #1 includes an ethylene/acrylic acid copolymer having 15.4 percent of the acid groups neutralized with a lithium ion. Similarly, Formulation #2 includes an ethylene/acrylic acid copolymer having 15.4 percent of the acid groups neutralized with a sodium ion. The melt index (MI) of Formulation #1 is 5, whereas the MI is 1 for Formulation #2. The control blend (Control #1) includes a 50/50 mixture of an ethylene/methacrylic acid (EMAA) copolymer, in which the MAA groups have been partially neutralized with lithium ions and an EMAA copolymer neutralized with sodium ions.

The formulations were tested for hardness and flexural modulus. The formulations were then used to form an inner cover layer (subjected to glebar) about a polybutadiene core have a Shore D hardness of about 52, a compression of about 71, a coefficient of restitution (COR) of about 0.807, and a diameter of 1.548 inches. Finally, the inner cover layers were covered with a relatively-thin polyurethane cover. The results are shown in Table 1 below.

TABLE 1

|  |  | Formulation #1 | Formulation #2 | Control #1 |
|---|---|---|---|---|
| Ethylene/15.4% acrylic acid (Li) (5 MI), rosin-modified | | 100 | | |
| Ethylene/15.4% acrylic acid (Na) (1 MI), rosin-modified | | | 100 | |
| 50% Surlyn ® 7940 (Li)/ 50% Surlyn ® 8940 (Na) | | | | 100 |
| Performance on Flex Bars | | | | |
| Flexural Modulus (psi) | 40 hours | 69,900 | 72,000 | 65,000 |
| | 2 weeks | 87,100 | 92,000 | — |
| Hardness (Shore D) | 40 hours | 67 | 67 | 62 |
| | 2 weeks | 69 | 68 | — |
| Performance on Glebared Casings | | | | |
| COR @ 125 ft/sec | | 0.812 | 0.809 | 0.809 |
| Hardness (Shore D) | | 68 | 68 | 61 |
| Performance on Finished Balls | | | | |
| COR @ 125 ft/sec | | 0.807 | 0.807 | 0.805 |
| Spin Rate from Standard Driver | | 3028 | 2809 | 2962 |
| Spin Rate from Half Wedge | | 6647 | 6790 | 6917 |

The flexural modulus values (after 2 weeks) of Formulations #1 and #2 were 87,000 and 92,000 psi, respectively, which are much higher than conventional ionomer flexural modulus values after 2 weeks. In addition, Formulations #1 and #2 were harder than the control inner cover. Furthermore, the COR values for the finished balls using the rosin-modified polymers of the present invention, i.e., Formulations #1 and #2, were higher than the COR value of the ball using the control inner cover layer.

Example 2

Rosin-Modified Compositions Compared to Non-Modified Compositions

Rosin-modified compositions and three non-modified compositions (controls) were tested for material performance, as well as for performance as part of a finished ball. In particular, Formulation #3 includes a medium acid rosin-modified ionomer, i.e., including about 14.5 to about 15.5 percent acid groups, Formulation #4 and #5 include high acid rosin-modified ionomers, i.e., including more than about 16 percent acid groups, Control #2 includes a medium acid ionomer, Control #3 includes a high acid ionomer, and Control #4 includes a 50/50 mixture of an ethylene/methacrylic acid (EMAA) copolymer, in which the MAA groups have been partially neutralized with lithium ions and an EMAA copolymer neutralized with sodium ions.

As in Example 1, the formulations were tested for hardness and flexural modulus both at 40 hours and 2 weeks. The formulations were then used to form an inner cover layer (subjected to glebar) about a polybutadiene core have a Shore D hardness of about 52, a compression of about 71, a coefficient of restitution (COR) of about 0.807, and a diameter of 1.548 inches. Finally, the inner cover layers were covered with a thin polyurethane cover. The results are shown in Table 2 below.

TABLE 2

|  | #3 | #4 | #5 | Control #2 | Control #3 | Control #4 |
|---|---|---|---|---|---|---|
| High Stiffness, Medium Acid Rosin-Modified Ionomer (15.4% acid groups) | 100 | | | | | |
| High Stiffness, High Acid Rosin-Modified Ionomer (>16% acid groups) | | 100 | | | | |
| High Stiffness, High Acid with Improved Toughness Rosin-Modified Ionomer (>16% acid groups) | | | 100 | | | |
| High Resilience, High Stiffness Medium Acid Ionomer (15.4% acid groups) | | | | 100 | | |
| High Resilience, High Stiffness High Acid Ionomer (>16% acid groups) | | | | | 100 | |
| 50% Surlyn ® 7940 (Li)/50% Surlyn ® 8940 (Na) | | | | | | 100 |

TABLE 2-continued

|  |  | #3 | #4 | #5 | Control #2 | Control #3 | Control #4 |
|---|---|---|---|---|---|---|---|
| Performance on Flex Bars | | | | | | | |
| Flexural Modulus (psi) | 40 hours | 82,200 | 90,200 | 83,100 | 54,400 | 50,200 | — |
|  | 2 weeks | 93,100 | 110,200 | 103,400 | 70,700 | 67,500 | — |
| Hardness (Shore D) | 40 hours | 66 | 69 | 66 | 58 | 58 | — |
|  | 2 weeks | 68 | 71 | 69 | 59 | 60 | — |
| Performance on Glebared Casings | | | | | | | |
| COR @ 125 ft/sec | | 0.814 | 0.816 | 0.815 | 0.812 | — | 0.809 |
| Hardness (Shore D) | | 68 | 69 | 68 | 59 | 61 | — |
| Performance on Finished Balls | | | | | | | |
| COR @ 125 ft/sec | | 0.808 | 0.813 | 0.811 | 0.808 | — | 0.807 |
| Spin Rate from Standard Driver | | 2967 | 2792 | 2902 | 3124 | — | 2962 |

The flexural modulus values (after 2 weeks) of Formulations #3-#5 were higher than the conventional ionomer flexural modulus values (controls #2-#4) after 40 hours and 2 weeks. In addition, Formulations #3-#5 were harder than inner covers formed from the controls. Furthermore, the COR values for the urethane-covered finished balls using the rosin-modified polymers of the present invention were equal to, e.g., Formulation #3, or higher than, i.e., Formulations #4-#5, the COR values for the balls having inner cover layers formed from the controls.

Example 3

Rosin-Modified Compositions Compared to Non-Modified Compositions

Three rosin-modified compositions (#6-#8) and one non-modified composition (Control #5)) were tested for material performance, as well as for performance as part of a finished ball. The control includes a 50/50 mixture of an ethylene/methacrylic acid (EMAA) copolymer, in which the MAA groups have been partially neutralized with lithium ions and an EMAA copolymer neutralized with sodium ions. Compositions #6 and #7 are rosin-modified versions of the control.

As in Examples 1 and 2, the formulations were tested for hardness and flexural modulus both at 40 hours and 2 weeks. The formulations were then used to form an inner cover layer (subjected to glebar) about a polybutadiene core have a Shore D hardness of about 52, a compression of about 71, a coefficient of restitution (COR) of about 0.807, and a diameter of 1.548 inches. Finally, the inner cover layers were covered with a thin polyurethane cover. The results are shown in Table 3 below.

TABLE 3

|  |  | #6 | #7 | Control #5 |
|---|---|---|---|---|
| Invention Formulation | | 100 | | |
| Invention Formulation | | | 100 | |
| 50% Surlyn ® 7940 (Li)/ 50% Surlyn ® 8940 (Na) | | | | 100 |
| Performance on Flex Bars | | | | |
| Flexural Modulus (psi) | 40 hours | 87,300 | 95,900 | — |
|  | 2 weeks | 105,200 | 114,700 | 56,900 |
| Hardness (Shore D) | 40 hours | 67 | 70 | — |
|  | 2 weeks | 70 | 71 | 60 |

TABLE 3-continued

|  | #6 | #7 | Control #5 |
|---|---|---|---|
| Performance on Glebared Casings | | | |
| COR @ 125 ft/sec | 0.817 | 0.819 | 0.816 |
| Hardness (Shore D) | 68 | 70 | 62 |
| Performance on Finished Balls | | | |
| COR @ 125 ft/sec | 0.812 | 0.814 | 0.807 |
| Spin Rate from Standard Driver | 3095 | 3035 | 3162 |
| Durability 1st Failure | 1 fail @ 100X | 1 fail @ 75X | 1 fail @ 300X |
| 50% Failure | +6 by 142X | +7 by 93X | +4 by 400X |

The flexural modulus values (after 2 weeks) of Formulations #6-#7 were higher than the conventional ionomer flexural modulus values (control #5) after 2 weeks. In addition, the compositions of the invention, i.e., Formulations #6-#7, were harder than inner covers formed from the controls. Furthermore, the COR values for the finished balls using the rosin-modified polymers of the present invention were higher than the COR value for a ball having an inner cover layer formed from the control blend. Finally, the durability data shows that while the rosin-modified compositions of the invention are stiffer, impact modifiers are clearly useful to improve the durability of the layers formed from the compositions of the invention.

Example 4

Rosin-Modified Blends

The compositions of the invention provided in Examples 1 and 2 were blended with a highly neutralized polymer and tested for material performance, as well as for performance as part of a finished ball. In particular, Formulation #8 includes 80 percent by weight Formulation #1, i.e., an ethylene/acrylic acid copolymer having 15.4 percent of the acid groups neutralized with a lithium ion, and 20 percent by weight of a highly neutralized polymer, i.e., HPF 1000 from DuPont. Similarly, Formulation #9 includes 80 percent by weight of Formulation #2, i.e., an ethylene/acrylic acid copolymer having 15.4 percent of the acid groups neutralized with a sodium ion. medium acid rosin-modified ionomer, and 20 percent by weight of HPF 1000. Formulation #10 includes 80 percent by weight of a medium acid rosin-modified ionomer and 20 percent by weight of HPF 1000. Formulations #11 and #12 each include 80 percent by weight of a high acid rosin-modified ionomers blended with 20 percent by weight of HPF 1000. Control #6 includes a medium acid ionomer blended with HPF 1000 and Control #7 includes a high acid ionomer blended with HPF 1000. Control #9 includes a 50/50 mixture of an ethylene/methacrylic acid (EMAA) copolymer, in which the MAA groups have been partially neutralized with lithium ions and an EMAA copolymer neutralized with sodium ions.

As in the previous examples, the formulations were tested for hardness and flexural modulus both at 40 hours and 2 weeks. The formulations were then used to form an inner cover layer (subjected to glebar) about a polybutadiene core have a Shore D hardness of about 52, a compression of about 71, a coefficient of restitution (COR) of about 0.807, and a diameter of 1.548 inches. Finally, the inner cover layers were covered with a polyurethane cover. The results are shown in Table 4 below.

molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples

TABLE 4

|  | | #8 | #9 | #10 | #11 | #12 | Control #6 | Control #7 | Control #8 |
|---|---|---|---|---|---|---|---|---|---|
| Highly Neutralized Polymer (HPF 1000) | | 20 | 20 | 20 | 20 | 20 | 20 | 20 | |
| Ethylene/15.4% acrylic acid (Li) (5 MI) | | 80 | | | | | | | |
| Ethylene/15.4% acrylic acid (Li) (1 MI) | | | 80 | | | | | | |
| High Stiffness, Medium Acid Rosin-Modified Ionomer | | | | 80 | | | | | |
| High Stiffness, High Acid Rosin-Modified Ionomer | | | | | 80 | | | | |
| High Stiffness, High Acid with Improved Toughness Rosin-Modified Ionomer | | | | | | 80 | | | |
| High Resilience, High Stiffness Medium Acid Ionomer | | | | | | | 80 | | |
| High Resilience, High Stiffness High Acid Ionomer | | | | | | | | 80 | |
| 50% Surlyn ® 7940 (Li)/ 50% Surlyn ® 8940 (Na) | | | | | | | | | 100 |
| Performance on Flex Bars | | | | | | | | | |
| Flexural Modulus (psi) | 70 hours | 43,600 | 46,400 | 46,800 | 47,300 | 46,100 | 52,600 | 48,200 | — |
|  | 2 weeks | 58,400 | 54,600 | 56,400 | 60,600 | 58,400 | 67,600 | 63,600 | — |
| Hardness (Shore D) | 70 hours | 59 | 60 | 60 | 60 | 60 | 56 | 55 | — |
|  | 2 weeks | 61 | 62 | 61 | 62 | 61 | 58 | 58 | — |
| Performance on Glebared Casings | | | | | | | | | |
| COR @ 125 ft/sec | | 0.811 | 0.808 | 0.808 | 0.807 | 0.807 | 0.812 | 0.814 | 0.813 |
| Hardness (Shore D) | | 62 | 62 | 62 | 62 | 61 | 56 | 57 | 59 |
| Performance on Finished Balls | | | | | | | | | |
| COR @ 125 ft/sec | | 0.802 | 0.801 | 0.798 | 0.799 | 0.799 | 0.808 | 0.810 | 0.807 |
| Durability | 1st Failure | 4 fail @ 103X | 2 fail @ 107X | 2 fail @ 110X | 2 fail @ 173X | 1 fail @ 44X | 1 fail @ 100X | 1 fail @ 61X | 1 fail @ 122X |
|  | 50% Failure | +3 by 122X | +4 by 133X | +5 by 142X | +6 by 189X | +5 by 89X | +6 by 123X | +6 by 126X | +5 by 200X |

The addition of the HNP decreased the flexural modulus values of the blends of the invention. In addition, the hardness values of the blends were lower than the previous examples that did not include a HNP. Finally, the blend hardness was slightly higher than the control compositions.

Other than in the operating examples, or unless otherwise expressly specified, all of the numerical ranges, amounts, values and percentages such as those for amounts of materials, times and temperatures of reaction, ratios of amounts, values for molecular weight (whether number average are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising:
a core formed of one or more layers;
an outer cover layer comprised of polyurethane or polyurea; and
an inner cover layer juxtaposed the outer cover layer and core and formed from a composition comprising:
an acid copolymer;
a rosin material having a softening point between 20° C. and 150° C. and an acid number of 1 to 30; and
an impact modifier selected from the group consisting of alkyl acrylate-based block copolymers or hydrogenated derivatives thereof, vinyl aromatic monomers, and mixtures thereof,
wherein the composition is formed by in-situ polymerization, and wherein about 10 percent to about 100 percent of acid groups are neutralized.

2. The golf ball of claim 1, wherein the rosin material is present in an amount of about 5 percent to about 50 percent by weight of the composition.

3. The golf ball of claim 1, wherein the composition has a flexural modulus of about 70,000 psi to about 120,000 psi at 40 hours.

4. The golf ball of claim 1, wherein the composition a hardness of about 60 Shore D to about 75 Shore D.

5. The golf ball of claim 1, wherein the impact modifier is an alkyl acrylate-based block copolymer having the following general structure:

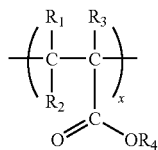

wherein x is a repeat unit from 100 to 100,000, $R_1$, $R_2$, and $R_3$ independently are H, aryl, or alkyl moieties having the formula $C_nH_{2n+1}$, n is from 1 to 6, and $R_4$ is an alkyl moiety having the formula $C_nH_{2n+1}$.

6. The golf ball of claim 1, wherein the impact modifier is an alkyl acrylate-based block copolymer having the following general structure:

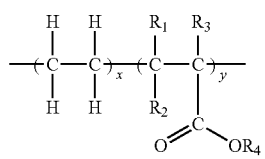

wherein x is from about 99 to about 1 weight percent, y is from about 1 to about 99 weight percent, $R_1$, $R_2$, and $R_3$ independently are H, aryl, or alkyl moieties having the formula $C_nH_{2n+1}$, n is from 1 to 6, and $R_4$ is an alkyl moiety having the formula $C_nH_{2n+1}$.

7. The golf ball of claim 1, wherein the impact modifier is an alkyl acrylate-based block copolymer having the following general structure:

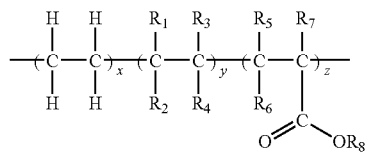

wherein x is from about 98 to about 1 weight percent, y is from about 1 to about 98 weight percent, z is from about 1 to about 10 weight percent, $R_1$, $R_2$, $R_3$, $R_4$, $R_5$, $R_6$, and $R_7$ independently are H, aryl, or alkyl moieties having the formula $C_nH_{2n+1}$, n is from 1 to 6, and $R_8$ is an alkyl moiety having the formula $C_nH_{2n+1}$.

8. The golf ball of claim 1, wherein the impact modifier is a vinyl aromatic monomer.

9. A golf ball comprising a core and a dual cover, wherein the dual cover comprises an inner cover layer and an outer cover layer, and wherein the inner cover layer is formed from a composition formed by in-situ polymerization of an acid copolymer, a rosin material having a softening point between 20° C. and 150° C. and an acid number of 1 to 30, and an impact modifier, wherein about 10 percent to about 100 percent of acid groups are neutralized, and wherein the outer cover layer comprises a castable reactive liquid material.

10. The golf ball of claim 9, wherein the castable reactive liquid material comprises polyurethane or polyurea.

11. The golf ball of claim 9, wherein rosin material is selected from the group consisting of rosins from wood oil, rosins from tall oil, dimerized rosins, hydrogenated rosin derivatives, modified rosins, ester rosins and salts thereof, esters of dimerized rosins and salts thereof, esters of hydrogenated rosins and salts thereof, esters of modified rosins and salts thereof, rosin amines and salts thereof, rosin ethoxylated derivatives, polyterpene rosins, maleic anhydride modified esters of tall oil rosins and salts thereof, fumaric anhydride modified esters of tall oil rosins and salts thereof, hydrogenated abietic acid and salts thereof, and mixtures thereof.

12. The golf ball of claim 9, wherein the rosin material has at least one of an iodine number from about 10 to about 200 or a density of about 5 lbs/gal to about 20 lbs/gal.

13. A golf ball comprising a core, a cover, and a layer juxtaposed the core and cover, wherein the layer comprises a composition formed by in-situ polymerization of an acid copolymer, a rosin material, and an impact modifier selected from the group consisting of alkyl acrylate-based block copolymers or hydrogenated derivatives thereof, vinyl aromatic monomers, and mixtures thereof, and wherein the outer cover layer comprises a castable reactive liquid material.

14. The golf ball of claim 13, wherein the rosin material is present in an amount of about 8 percent to about 42 percent by weight of the composition.

15. The golf ball of claim 14, wherein the rosin material is present in an amount of about 10 percent to about 40 percent by weight of the composition.

16. The golf ball of claim 13, wherein about 10 percent to about 100 percent of acid groups are neutralized.

17. The golf ball of claim 13, wherein the rosin material has at least one of a softening point between 20° C. and 150° C., an acid number of 1 to 30, an iodine number from about 10 to about 200, or a density of about 5 lbs/gal to about 20 lbs/gal.

18. The golf ball of claim 13, wherein the castable reactive liquid material comprises polyurethane or polyurea.

* * * * *